(12) United States Patent
Liang

(10) Patent No.: US 11,869,516 B2
(45) Date of Patent: Jan. 9, 2024

(54) VOICE PROCESSING METHOD AND APPARATUS, COMPUTER- READABLE STORAGE MEDIUM, AND COMPUTER DEVICE

(71) Applicant: TENCENT TECHNOLOGY (SHENZHEN) COMPANY LIMITED, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 17/520,733

(22) Filed: Nov. 8, 2021

(65) Prior Publication Data
US 2022/0059101 A1 Feb. 24, 2022

Related U.S. Application Data

(63) Continuation of application No. PCT/CN2020/116511, filed on Sep. 21, 2020.

(30) Foreign Application Priority Data

Nov. 27, 2019 (CN) .......................... 201911179869.6

(51) Int. Cl.
*G10L 19/005* (2013.01)
*H04L 1/00* (2006.01)
(52) U.S. Cl.
CPC ............ *G10L 19/005* (2013.01); *H04L 1/004* (2013.01)
(58) Field of Classification Search
CPC ....... G10L 19/005; G10L 15/04; G10L 25/48; G10L 25/90; G10L 2015/025;
(Continued)

(56) References Cited

U.S. PATENT DOCUMENTS 4,066,964 A * 1/1978 Costanza ............... H04K 1/003
375/279
5,907,822 A * 5/1999 Prieto, Jr. ............. G10L 19/005
704/226
(Continued)

FOREIGN PATENT DOCUMENTS

CN 101072083 A 11/2007
CN 101523845 A * 9/2009
(Continued)

OTHER PUBLICATIONS

Feifei Xiongy, Jon Barkery, Heidi Christensen, Phonetic Analysis of Dysarthric Speech Tempo and Applications To Robust Personalised Dysarthric Speech Recognition, 2019, IEEE, pp. 5836-5840 (Year: 2019).*

(Continued)

*Primary Examiner* — Richemond Dorvil
*Assistant Examiner* — Nadira Sultana
(74) *Attorney, Agent, or Firm* — ANOVA LAW GROUP PLLC

(57) ABSTRACT

A voice processing method is provided for a terminal. The method includes: performing voice speed detection on a voice obtained from a voice source, to obtain a voice speed value of the voice; obtaining a forward error correction (FEC) redundancy; adjusting the FEC redundancy according to the voice speed value to obtain a target redundancy; performing voice encoding on the voice to obtain a voice encoded packet; performing FEC encoding on the voice encoded packet according to the target redundancy to obtain a redundancy packet; and transmitting the redundancy packet and the voice encoded packet to a receiving end.

18 Claims, 7 Drawing Sheets

(58) Field of Classification Search
CPC ..... H04L 1/004; H04L 1/0009; H04L 1/0045; H04L 1/0046; H04L 1/22; H04L 1/0017; H04L 1/00; H04K 1/003
See application file for complete search history.

(56) References Cited

U.S. PATENT DOCUMENTS

| | | | | |
|---|---|---|---|---|
| 6,671,292 | B1 * | 12/2003 | Haartsen | H04L 1/0033 370/412 |
| 11,502,973 | B2 * | 11/2022 | Mani | H04L 1/007 |
| 2017/0103761 | A1 * | 4/2017 | Sun | G10L 19/028 |
| 2019/0371345 | A1 * | 12/2019 | Bhatia | G10L 19/167 |
| 2020/0074988 | A1 * | 3/2020 | Park | G06N 3/045 |
| 2020/0075033 | A1 * | 3/2020 | Hijazi | G06N 3/086 |

FOREIGN PATENT DOCUMENTS

| | | | |
|---|---|---|---|
| CN | 103597544 A | * | 2/2014 |
| CN | 104167210 A | | 11/2014 |
| CN | 108183774 A | | 6/2018 |
| CN | 108684050 A | | 10/2018 |
| CN | 110838894 A | | 2/2020 |
| CN | 111245734 A | | 6/2020 |
| JP | 2014007664 A | * | 1/2014 |
| WO | WO-2010141762 A1 | * | 12/2010 |
| WO | WO-2015085959 A1 | * | 6/2015 |
| WO | WO-2017053154 A1 | * | 3/2017 |

OTHER PUBLICATIONS

I. R. Smith, Adaptation of Spread Spectrum Digital Voice Radios, 1985, IEEE, pp. 44-48 (Year: 1985).*
Venkat Raju Gandikota, Bheemarjuna Reddy Tamma, C. Siva Ram Murthy, Adaptive FEC-Based Packet Loss Resilience Scheme for Supporting Voice Communication over Ad Hoc Wireless Networks, Oct. 2008, IEEE, vol. 7, pp. 1184-1199 (Year: 2008).*
Chinmay Padhye, Kenneth J. Christensen, Wilfrido Moreno, A New Adaptive FEC Loss Control Algorithm for Voice Over IP Applications, 2000, IEEE, pp. 307-313 (Year: 2000).*
The World Intellectual Property Organization (WIPO) International Search Report for PCT/CN2020/116511 dated Dec. 10, 2020 6 Pages (including translation).

* cited by examiner

VOICE PROCESSING METHOD AND APPARATUS, COMPUTER- READABLE STORAGE MEDIUM, AND COMPUTER DEVICE

RELATED APPLICATIONS

This application is a continuation application of PCT Patent Application No. PCT/CN2020/116511, filed on Sep. 21, 2020, which claims priority to Chinese Patent Application No. 2019111798696, entitled "VOICE PROCESSING METHOD AND APPARATUS, COMPUTER-READABLE STORAGE MEDIUM, AND COMPUTER DEVICE" filed with the China National Intellectual Property Administration on Nov. 27, 2019, the entire contents of both of which are incorporated herein by reference.

FIELD OF THE TECHNOLOGY

This application relates to the field of voice processing technologies, and in particular, to a voice processing method and apparatus, a computer-readable storage medium, and a computer device.

BACKGROUND

During a voice call, a voice may be transmitted from a transmitting end to a receiving end through a network. Due to network quality problems, a voice packet may be lost during the voice transmission, resulting in stuttering and discontinuity of the voice received by the receiving end, which affects the voice answering effect.

In the conventional anti-packet loss solution, forward error correction (FEC) encoding is performed on a voice packet to obtain a redundancy packet. Both the voice packet and redundancy packet are transmitted to the receiving end. If packet loss occurs, the receiving end can recover a complete voice at a packet loss location according to the redundancy packet, thereby achieving the effect of anti-packet loss. A greater FEC redundancy (that is, a ratio of a number of redundancy packets to a number of voice packets) indicates a stronger anti-packet loss capability, but a large amount of bandwidths needs to be consumed. If the FEC redundancy is relatively small, the error correction effect cannot be achieved. The disclosed methods and systems are directed to solve one or more problems set forth above and other problems.

SUMMARY

According to one aspect of the present disclosure, a voice processing method is provided for a terminal. The method includes: performing voice speed detection on a voice obtained from a voice source, to obtain a voice speed value of the voice; obtaining a forward error correction (FEC) redundancy; adjusting the FEC redundancy according to the voice speed value to obtain a target redundancy; performing voice encoding on the voice to obtain a voice encoded packet; performing FEC encoding on the voice encoded packet according to the target redundancy to obtain a redundancy packet; and transmitting the redundancy packet and the voice encoded packet to a receiving end.

According to another aspect of the present disclosure, a voice processing apparatus is provided. The voice processing apparatus includes a memory storing computer program instructions, and a processor coupled to the memory. When executing the computer program instructions, the processor is configured to perform: performing voice speed detection on a voice obtained from a voice source, to obtain a voice speed value of the voice; obtaining a forward error correction (FEC) redundancy; adjusting the FEC redundancy according to the voice speed value to obtain a target redundancy; performing voice encoding on the voice to obtain a voice encoded packet; performing FEC encoding on the voice encoded packet according to the target redundancy to obtain a redundancy packet; and transmitting the redundancy packet and the voice encoded packet to a receiving end.

According to another aspect of the present disclosure, a non-transitory computer-readable storage medium is provided. The non-transitory computer-readable storage medium stores computer program instructions executable by at least one processor to perform: performing voice speed detection on a voice obtained from a voice source, to obtain a voice speed value of the voice; obtaining a forward error correction (FEC) redundancy; adjusting the FEC redundancy according to the voice speed value to obtain a target redundancy; performing voice encoding on the voice to obtain a voice encoded packet; performing FEC encoding on the voice encoded packet according to the target redundancy to obtain a redundancy packet; and transmitting the redundancy packet and the voice encoded packet to a receiving end.

Other aspects of the present disclosure can be understood by those skilled in the art in light of the description, the claims, and the drawings of the present disclosure.

DETAILED DESCRIPTION

To make the objectives, technical solutions, and advantages of the present disclosure clearer and more understandable, the present disclosure is further described in detail below with reference to the accompanying drawings. It is to be understood that the specific embodiments described herein are merely used for explaining the present disclosure but are not intended to limit the present disclosure.

Figure 1:
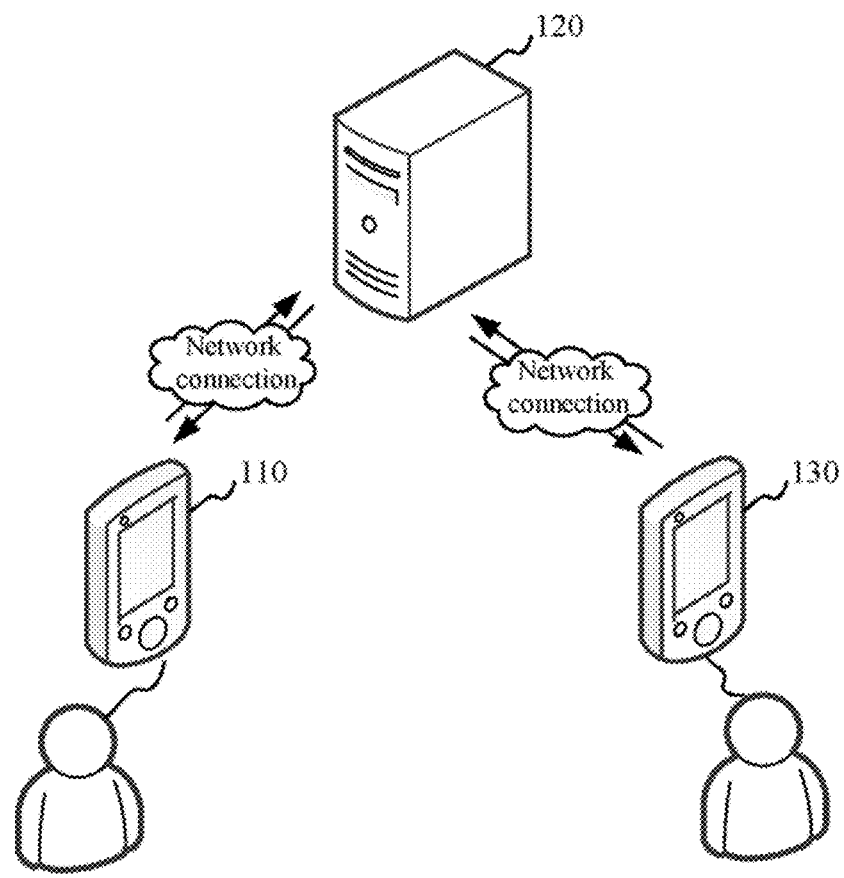
FIG. 1 is a diagram of an application environment of a voice processing method according to an embodiment of the present disclosure.

FIG. 1 is a diagram of an application environment of a voice processing method according to an embodiment of the present disclosure. Referring to FIG. 1, the voice processing method is applied to a voice processing system. The voice processing system includes a terminal 110, a transmission node 120, and a terminal 130. The terminal 110, the transmission node 120, and the terminal 130 are connected through a network. The terminal 110 may be used as a transmitting end (or a receiving end), and may be specifically a desktop terminal or a mobile terminal. The mobile terminal may be specifically at least one of a mobile phone, a tablet computer, a notebook computer, and the like. Correspondingly, the terminal 130 may be used as a receiving end (or a transmitting end). When the terminal 110 is a transmitting end, the terminal 130 may be a receiving end, and may be specifically a desktop terminal or a mobile terminal. The mobile terminal may be specifically at least one of a mobile phone, a tablet computer, a notebook computer, and the like. The transmission node 120 may include a switch (or router) and another transmission device in the network, such as a synchronous digital hierarchy (SDH) or packet transport network (PTN) device. In addition, the transmission node 120 may further include communication base stations, such as 3G, 4G, 5G, and subsequent versions of communication base stations.

Figure 2:
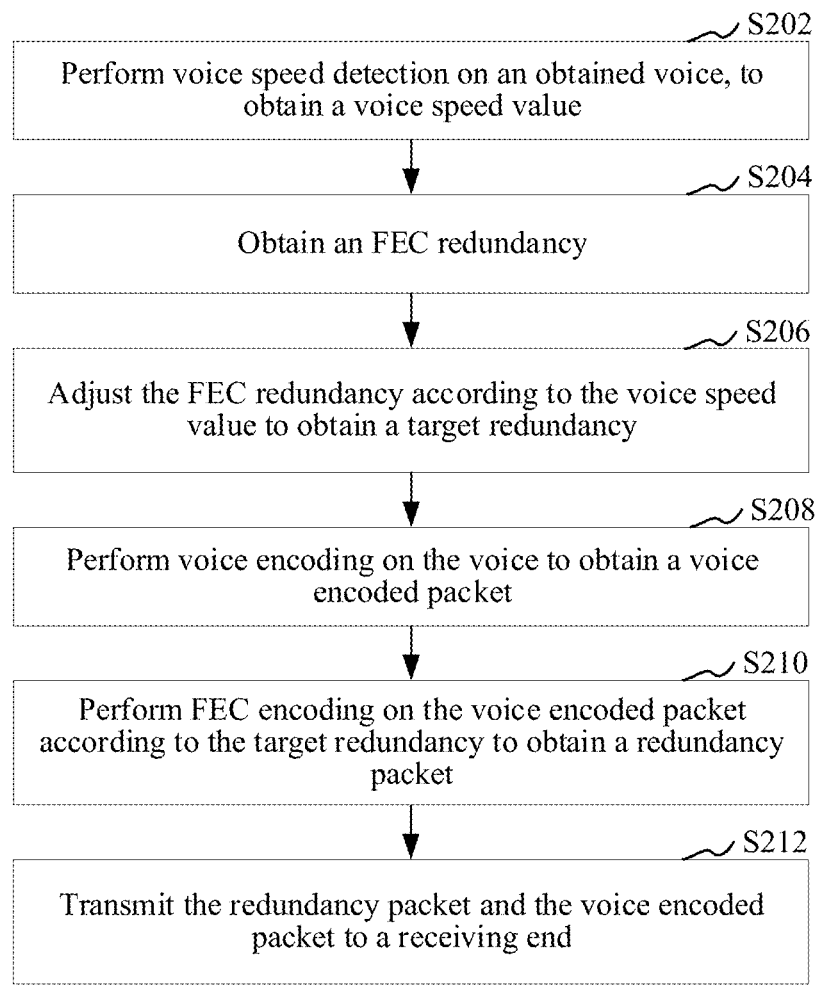
FIG. 2 is a schematic flowchart of a voice processing method according to an embodiment of the present disclosure.

As shown in FIG. 2, in an embodiment, a voice processing method is provided, and descriptions are provided mainly by using an example in which the method is applied to the terminal 110 in FIG. 1. Referring to FIG. 2, the voice processing method further includes the followings.

S202: Perform voice speed detection on an obtained voice, to obtain a voice speed value.

The voice may be a voice uttered by a user during a voice or video call, or may be a voice uttered during a voice or video live broadcast. The voice speed value may be a value used to indicate a speaking speed of a speaker, and different speakers may have a certain difference in voice speed values. The voice speed value may be an average voice speed value or an instantaneous voice speed value.

In an embodiment, when a voice or video call is made, the terminal collects the voice uttered by the user by using a microphone. For example, when the user uses an instant messaging application to make a voice or video call with another person, the terminal uses a built-in microphone to collect a voice uttered by the user. The instant messaging applications may include social applications and other applications for instant messaging.

In an embodiment, when a voice or video live broadcast is made, the terminal collects the voice uttered by the user by using a microphone. For example, when the user uses live streaming software to make a voice or video live broadcast with another person, the terminal uses a built-in microphone to collect a voice uttered by the user.

In an embodiment, the terminal performs phoneme detection on the collected voice to obtain a phoneme sequence; calculates a number of phonemes per unit time based on the obtained phoneme sequence; and determines the voice speed value according to the number of phonemes per unit time. The number of phonemes may be determined by hopping of a pitch period or a pitch frequency. For example, if there are 20 hoppings of the pitch period or the pitch frequency per unit time, it may be determined that there are 20 phonemes per unit time. Phonemes are divided into two categories of vowels and consonants. A phoneme is a minimum phonetic unit obtained through division according to a natural attribute of a voice. According to a pronunciation action in a syllable, one action constitutes one phoneme. For example, the Chinese syllable 'a' has only one phoneme, 'ai' has two phonemes, and 'dai' has three phonemes.

In an embodiment, the terminal performs phoneme detection on the collected voice to obtain a phoneme sequence; converts the phoneme sequence into a corresponding word sequence; calculates a number of words per unit time based on the converted word sequence; and determines the voice speed value according to the number of words per unit time.

In an embodiment, the terminal uses a window function to frame the collected voice, so as to obtain the framed voice. Specifically, the collected voice may be framed in a manner of overlapping segments, so that a smooth transition between frames can be implemented. An overlapping part of a previous frame and a next frame is referred to as a frame shift, and a ratio between a frame length of the frame shift and a frame length of the voice frame is usually in a range of 0 to 0.5. The window function may be a rectangular window function, a Hanning window function, a Hamming window function, or a Blackman window function.

Figure 3:
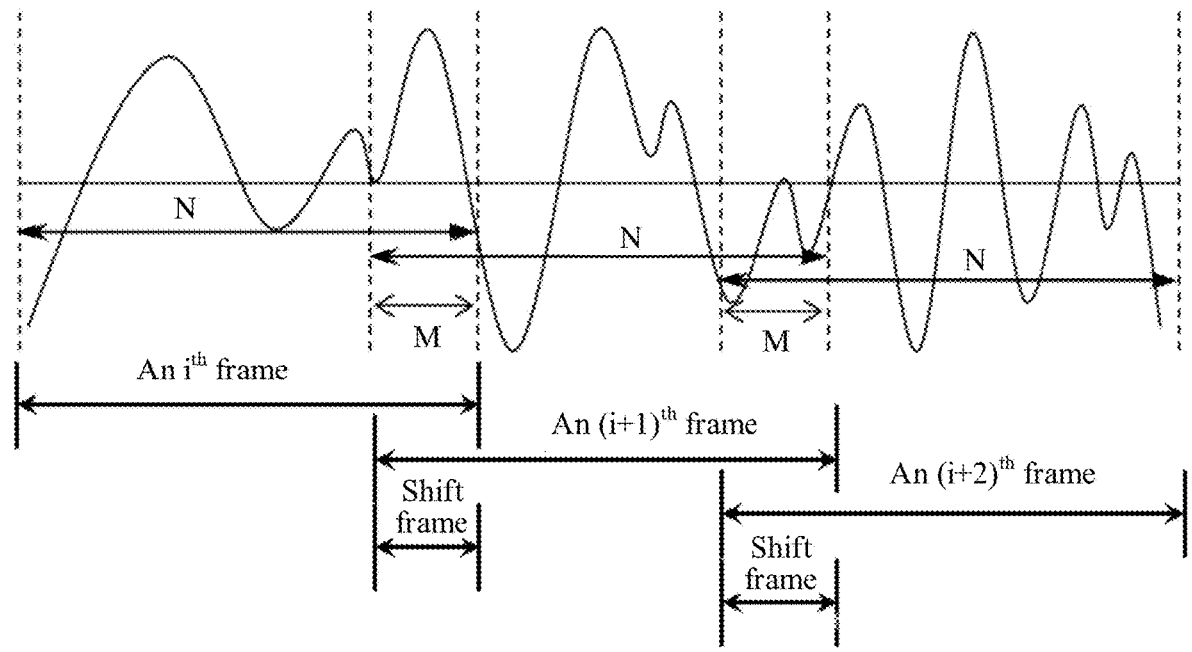
FIG. 3 is a schematic diagram of voice framing according to an embodiment of the present disclosure.

For example, it is assumed that the voice is represented by $s(n)$, a window function $\omega(n)$ is used to multiply $s(n)$ to form a windowed voice $S\omega = s \times \omega(n)$. As shown in FIG. 3, the frame length of the voice frame is N, and the frame length of the shift frame is M.

In an embodiment, the terminal detects each voice frame and detects whether each voice frame includes voice content, so that the terminal can perform voice speed detection on a voice frame including voice content, to obtain a phoneme sequence; calculates a number of phonemes per unit time based on the obtained phoneme sequence; and determines the voice speed value according to the number of phonemes per unit time. Alternatively, the terminal converts the phoneme sequence into a corresponding word sequence; calculates a number of words per unit time based on the converted word sequence; and determines the voice speed value according to the number of words per unit time.

S204: Obtain an FEC redundancy.

The FEC redundancy is configured according to a packet loss rate. FEC is an error control method, that is, a redundancy packet is also transmitted while transmitting a voice. When a packet loss or error occurs during transmission, the receiving end is allowed to reconstruct the lost or erroneous part of the voice based on the redundancy packet. For example, before the voice is sent to a transmission channel, FEC encoding is pre-performed on a voice encoded packet corresponding to the voice to obtain a redundancy packet with a feature of the voice, and the voice encoded packet and the redundancy packet are transmitted to the receiving end. The receiving end decodes the received voice encoded packet and redundancy packet, to find and correct an erroneous or lost voice encoded packet during the transmission. The FEC redundancy may represent a ratio of a number of redundancy packets formed to a number of voice encoded packets during the FEC encoding. The FEC redundancy may be configured according to a loss rate of the voice encoded packet.

In an embodiment, when receiving a voice encoded packet transmitted by the other party, the terminal determines the FEC redundancy configured corresponding to a packet loss rate according to the received voice encoded packet. When the packet loss rate is relatively large, the configured FEC redundancy is also relatively large; and when the packet loss rate is relatively small, the configured FEC redundancy is also relatively smaller.

In an embodiment, the terminal may further predict the packet loss rate according to the network quality, and configure the corresponding FEC redundancy according to the predicted packet loss rate. Alternatively, the terminal may also configure the corresponding FEC redundancy according to the network quality.

For example, when the network quality is relatively poor, the packet loss rate is usually relatively larger, and a larger FEC redundancy may be configured in this case. When the network quality is relatively good, the packet loss rate is usually small, and a relatively small FEC redundancy may be configured in this case.

S206: Adjust the FEC redundancy according to the voice speed value to obtain a target redundancy.

Due to different languages and speaking habits of different speakers, the corresponding voice speed values are different when speaking. When a voice speed of a speaker is fast, an amount of information included in a voice collected per unit time is relatively large, that is, many different phonemes are included within a certain period of time. Therefore, even a small number of lost voice encoded packets may result in the loss of many phonemes, and consequently, the amount of information obtained by the receiving end is incomplete. Similarly, when a voice speed of the speaker is relatively slow, an amount of information included in a voice collected per unit time is relatively small, that is, there are fewer phonemes with a certain period of time, and most of the phonemes are phonemes with similar features. In this case, even if a small amount of voice packets are lost, the user at the receiving end may learn the content expressed by the transmitter through the remaining phonemes received.

In an embodiment, when the voice speed value is relatively large, the terminal may increase the FEC redundancy; and when the voice speed value is relatively small, the terminal may decrease the FEC redundancy, thereby obtaining the target redundancy.

In an embodiment, when the voice speed value is relatively large, the terminal may obtain a corresponding first adjustment coefficient, and use the product of the first adjustment coefficient and the FEC redundancy as the target redundancy. When the voice speed value is relatively small, the terminal may obtain a corresponding second adjustment coefficient, and use the product of the second adjustment coefficient and the FEC redundancy as the target redundancy.

S208: Perform voice encoding on the voice to obtain a voice encoded packet.

In an embodiment, the terminal samples the collected voice, where a sampling frequency is greater than two times of the highest frequency of a voice signal. The terminal then quantizes the sampled voice. The quantization may be uniform quantization or non-uniform quantization, and the non-uniform quantization may use a μ-law compression algorithm or an A-law compression algorithm. Finally, the terminal encodes the quantized voice, and packs voice encoded data obtained through encoding into a plurality of voice encoded packets. The encoding methods include waveform encoding (such as pulse code modulation (PCM) encoding), parameter encoding, and hybrid encoding.

When uniform quantization is used to quantize the sampled voice, a same quantization interval is used for both a large-amplitude voice and a small-amplitude voice, to adapt to the large-amplitude voice and ensure quantization accuracy. When non-uniform quantization is used, a larger quantization interval is used for a large-amplitude voice, and a smaller quantization interval is used for a small-amplitude voice, so that a smaller quantization bit can be used while ensuring accuracy.

S210: Perform FEC encoding on the voice encoded packet according to the target redundancy to obtain a redundancy packet.

In an embodiment, the terminal performs FEC encoding on the voice encoded packet according to the target redundancy, to obtain the redundancy packet. A number of the redundancy packets is a product of the target redundancy and a number of the voice encoded packets.

For example, it is assumed that the number of the voice encoded packets is k, a word length is w bits, and the value of w may be 8, 16, or 32. The terminal performs FEC encoding on the k voice encoded packets according to the target redundancy, and generates m redundancy packets corresponding to the voice encoded packets.

S212: Transmit the redundancy packet and the voice encoded packet to a receiving end.

In an embodiment, the terminal uses a real-time transport protocol (RTP) to encapsulate the voice encoded packet and the redundancy packet to obtain a voice packet after the encapsulation, and then transmits the voice packet obtained by encapsulating the voice encoded packet and the redundancy packet to the receiving end.

The RTP may provide end-to-end transmission services with real-time features for the voice. The RTP implements orderly transmission. The RTP allows the receiving end to reorganize a packet sequence of the transmitting end. In addition, a sequence number may be used to determine a proper packet location. The voice packet is a voice packet in an RTP message format, and includes two parts: a header and a payload. The payload is the voice encoded packet and the redundancy packet.

For example, it is assumed that there are k voice encoded packets $\vec{D}=(D_1, D_2, \ldots, D_k)$, the FEC redundancy is r/k, and the number of the redundancy packets calculated according to the target redundancy and the voice encoded packet is r. If r redundancy packets are $C=(C_1, C_2, \ldots, C_r)$, the voice packets are expressed as $\vec{Y}=(Y_1, Y_2, \ldots, Y_n)$, where $Y_i=D_i$ ($0\leq i\leq k-1$), and $Y_j=C_j$ ($k\leq j\leq n-1$). B is an n×k-dimensional FEC matrix. The FEC matrix is formed by an identity matrix I and a matrix G. The voice packet may be expressed as follows:

$$\vec{Y} = \vec{BD} = \begin{bmatrix} I \\ G \end{bmatrix}\vec{D}$$

Figure 4A:
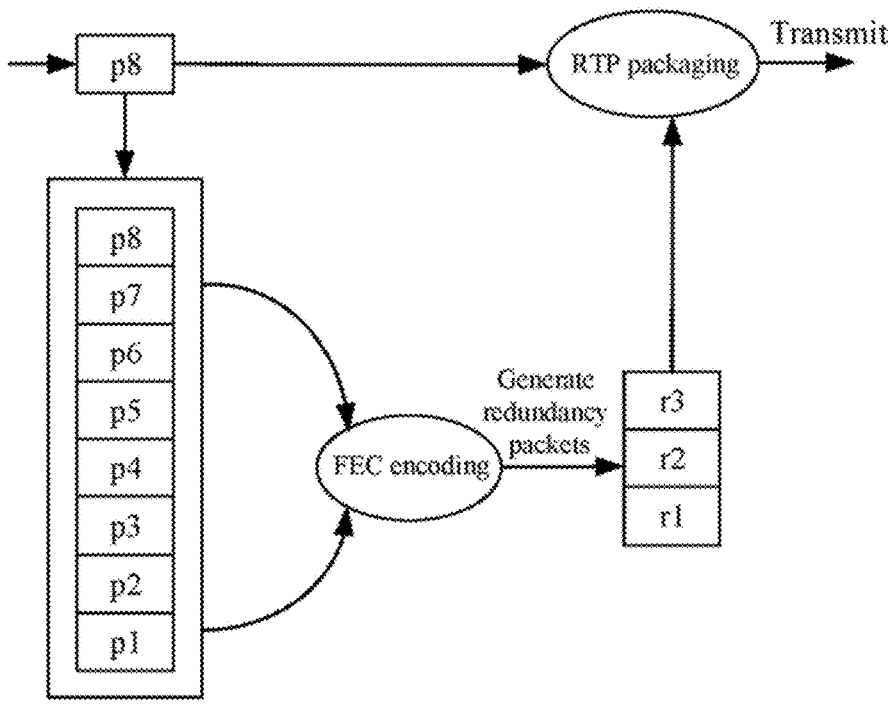
FIG. 4A is a schematic diagram of performing FEC encoding by a transmitting end according to an embodiment of the present disclosure.

In an example, as shown in FIG. 4A, the terminal encodes the collected voice to obtain voice encoded packets p1 to p8. When the FEC redundancy is adjusted to obtain the target redundancy, FEC encoding is performed on the voice encoded packets p1 to p8 according to requirements of the target redundancy, to obtain redundancy packets r1, r2, and r3. Voice packets including the voice encoded packets p1 to p8 and the redundancy packets r1 to r3 are obtained through RTP encapsulation. The voice packets are then transmitted to the receiving end through the network.

In an embodiment, the terminal may alternatively receive voice packets transmitted from the receiving end. The voice packets include voice encoded packets and redundancy packets. If the voice packets are parsed to find that there is packet loss, a lost voice encoded packet may be reconstructed according to the remaining voice encoded packets and redundancy packets, to obtain complete voice encoded packets. The voice encoded packets are decoded to obtain a corresponding voice.

For example, at the receiving end, if the receiving end receives any k packets in the voice packets, a corresponding row may be extracted from an FEC matrix $\vec{B}$ according to location information of the received packets in the voice packets, to form a new k×k-dimensional matrix B', then:

$$\vec{Y} = B'\vec{D}$$

Figure 4B:
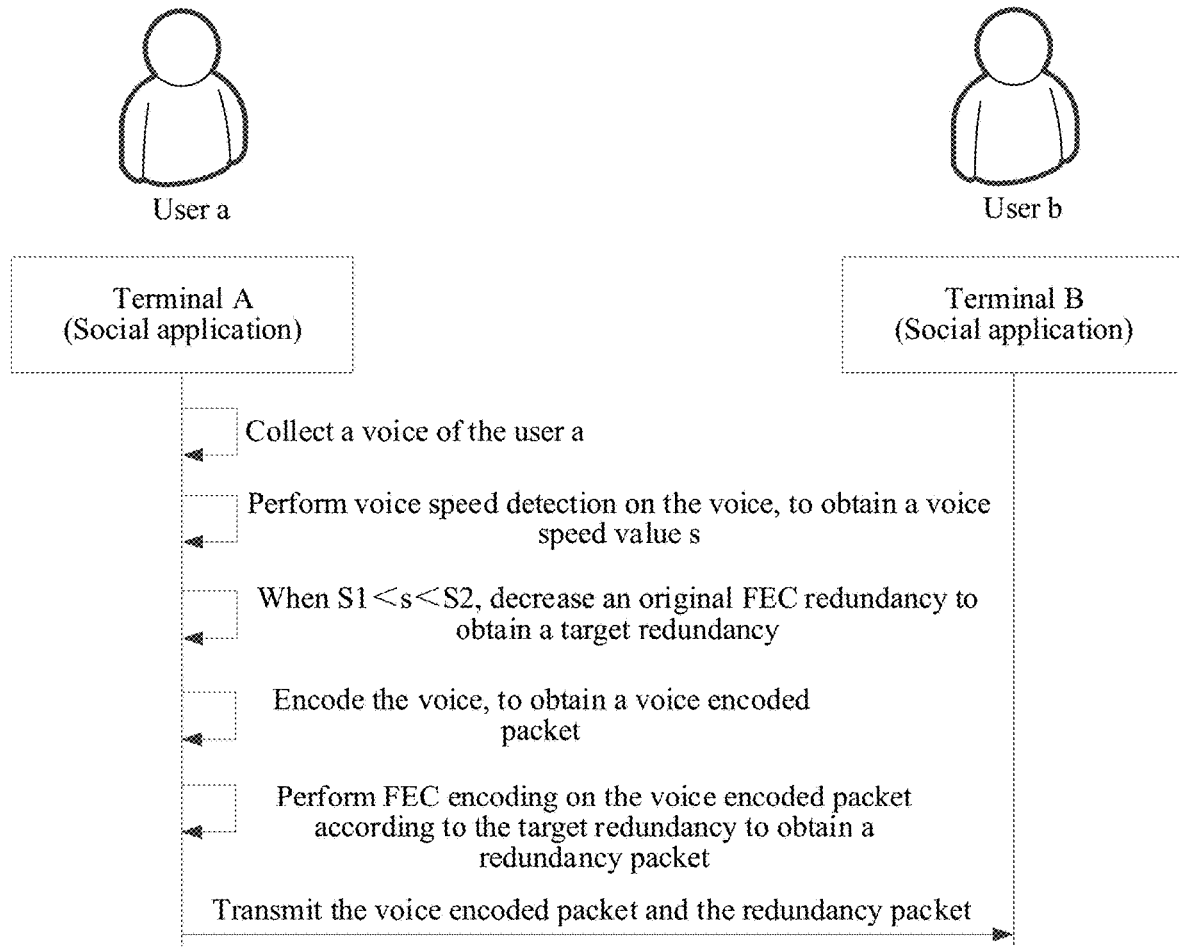
FIG. 4B is a schematic flowchart of a voice processing method according to another embodiment of the present disclosure.

If the matrix B' is a non-singular matrix, an original voice encoded packet is obtained through the following inverse transformation, to complete restoration. A transformation formula is as follows:

In an example, the voice processing method may be applied to an application scenario of network communication. Referring to FIG. 4b, the details are as follows: a user a and a remote user b conduct voice communication by using social applications, and a terminal A of the user a performs, when collecting a voice uttered by the user a, voice speed detection on the voice uttered by the user a, to obtain a voice speed value 's'. When the voice speed value 's' is greater than a voice speed lower limit S1 and less than a voice speed upper limit S2, an original FEC redundancy is adjusted according to the voice speed value 's', to obtain a target redundancy, such as reducing the FEC redundancy to obtain the target redundancy. When the obtained voice is encoded to obtain a voice encoded packet, FEC encoding is performed on the voice encoded packet according to the target redundancy to obtain a redundancy packet, and the redundancy packet and the voice encoded packet are transmitted to a terminal B of the user b.

In the foregoing embodiment, voice speed detection is performed on the voice, and the voice speed value obtained through detection is used to adjust the FEC redundancy, so that the adjusted target redundancy may be used to perform FEC encoding on the voice encoded packet, to obtain the redundancy packet. When the voice speed is relatively slow, the voice packet includes less voice content; and when the voice speed is relatively fast, the voice packet includes more voice content. The FEC redundancy is dynamically adjusted according to the voice speed value, which can ensure that a lost voice packet can be effectively restored, thereby implementing effective error correction of the voice packet, and avoiding the additional consumption of a large amount of bandwidths.

Figure 5:
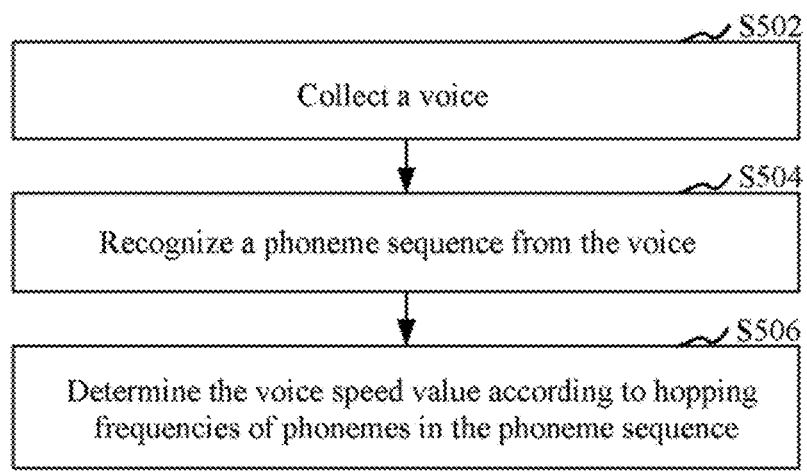
FIG. 5 is a schematic flowchart of calculating a voice speed value according to an embodiment of the present disclosure.

In an embodiment, as shown in FIG. 5, S202 may further include the followings.

S502: Collect a Voice.

The voice may be a voice collected by using a microphone in an early stage of a voice or video call of the user; or may be a voice collected by using a microphone in an early stage of a voice or video live broadcast of the user.

In an embodiment, when a voice or video call is made by using an instant messaging application, the terminal collects the voice uttered by the user by using a microphone. The instant messaging applications may include social applications and other applications for instant messaging.

In an embodiment, when a voice or video live broadcast is made by using live streaming software, the terminal collects the voice uttered by the user by using a microphone.

In an embodiment, the terminal uses a window function to frame the collected voice, so as to obtain the framed voice. Specifically, the collected voice may be framed in a manner of overlapping segments, so that a smooth transition between frames can be implemented. An overlapping part of a previous frame and a next frame is referred to as a frame shift, and a ratio between a frame length of the frame shift and a frame length of the voice frame is usually in a range of 0 to 0.5.

In an embodiment, the terminal detects each voice frame and detects whether each voice frame includes voice content, so that the terminal can perform voice speed detection on a voice frame including voice content.

In an embodiment, the method of detecting whether each voice frame includes voice content may further include: the terminal performs PCM on each voice frame to obtain PCM voice data, and inputs the PCM voice data into a vad voice detection function, to output a voice identifier. For example, if the outputted voice identifier is 0, no voice content is included; and if the outputted voice identifier is 1, voice content is included.

S504: Recognize a Phoneme Sequence from the Voice.

Phonemes are divided into two categories of vowels and consonants. A phoneme is a minimum phonetic unit obtained through division according to a natural attribute of a voice. According to a pronunciation action in a syllable, one action constitutes one phoneme. For example, the Chinese syllable 'a' has only one phoneme, 'ai' has two phonemes, and dai' has three phonemes.

In an embodiment, S504 may further include: performing PCM on the voice to obtain voice encoded data; recognizing a voice segment including voice content from the voice encoded data; and recognizing the phoneme sequence from the voice segment of the voice encoded data.

In an embodiment, the process of performing PCM on the voice to obtain voice encoded data may further include: the terminal samples the collected voice, where a sampling frequency is greater than two times of the highest frequency of a voice signal. The terminal then quantizes the sampled voice. The quantization may be uniform quantization or non-uniform quantization, and the non-uniform quantization may use a μ-law compression algorithm or an A-law compression algorithm. Finally, the terminal encodes the quantized voice, and packs voice encoded data obtained through encoding into a plurality of voice encoded packets. The encoding methods include waveform encoding, parameter encoding, and hybrid encoding.

In another embodiment, S504 may further include: the terminal extracts a voice feature from the voice; decodes the voice feature to obtain the decoded voice feature; and recognizes the phoneme sequence from the decoded voice feature.

The voice feature may be a logarithmic power spectrum or mel frequency cepstrum coefficient of the voice.

In an embodiment, the terminal performs Fourier transform on the collected voice, and converts a voice in the time domain into a frequency spectrum in the frequency domain. The terminal obtains an amplitude corresponding to the frequency spectrum, and uses a power density function to calculate a power spectrum according to the amplitude.

For example, it is assumed that a signal expression of the voice is f(t), and Fourier transform is performed on f(t) to obtain the frequency spectrum. If the expression of frequency spectrum is $F_T(w)$, the amplitude corresponding to the frequency spectrum is substituted into the following power spectrum density function to obtain the power spectrum of the voice.

$$P(w) = \frac{1}{2\pi} \lim_{T \to \infty} \frac{|F_T(w)|^2}{T}$$

Specifically, the terminal performs Viterbi decoding on the extracted voice feature according to an adaptive acoustic model, and recognizes the phoneme sequence from the decoded voice feature. In addition, the terminal may further determine a start time and an end time of each phoneme in the phoneme sequence.

S506: Determine the voice speed value according to hopping frequencies of phonemes in the phoneme sequence.

In an embodiment, S506 may further include: detecting a number of hoppings of a pitch period or a pitch frequency of phonemes in the phoneme sequence per unit time; and determining the voice speed value according to the number of hoppings per unit time.

In an embodiment, the terminal determines whether the number of hoppings of the pitch period or the pitch frequency is greater than a preset pitch frequency hopping threshold. If yes, it is determined that the pitch of the voice significantly changes; and if not, it is determined that the pitch of the voice does not significantly change. The pitch period and the pitch frequency are reciprocals of each other and may be converted to each other.

In an embodiment, the terminal performs PCM on each voice frame to obtain PCM voice data, and inputs the PCM voice data into a pitch frequency estimation function to obtain a pitch frequency corresponding to each voice frame. The pitch frequency estimation function may be based on a time-domain autocorrelation function.

In the foregoing embodiment, the phoneme sequence is recognized from the collected voice, and the voice speed value is determined according to the hopping frequencies of the phonemes in the phoneme sequence, so that the FEC redundancy can be dynamically adjusted according to the voice speed value, which can ensure that a lost voice packet can be effectively restored, thereby implementing effective error correction of the voice packet, and avoiding the additional consumption of a large amount of bandwidths.

Figure 6:
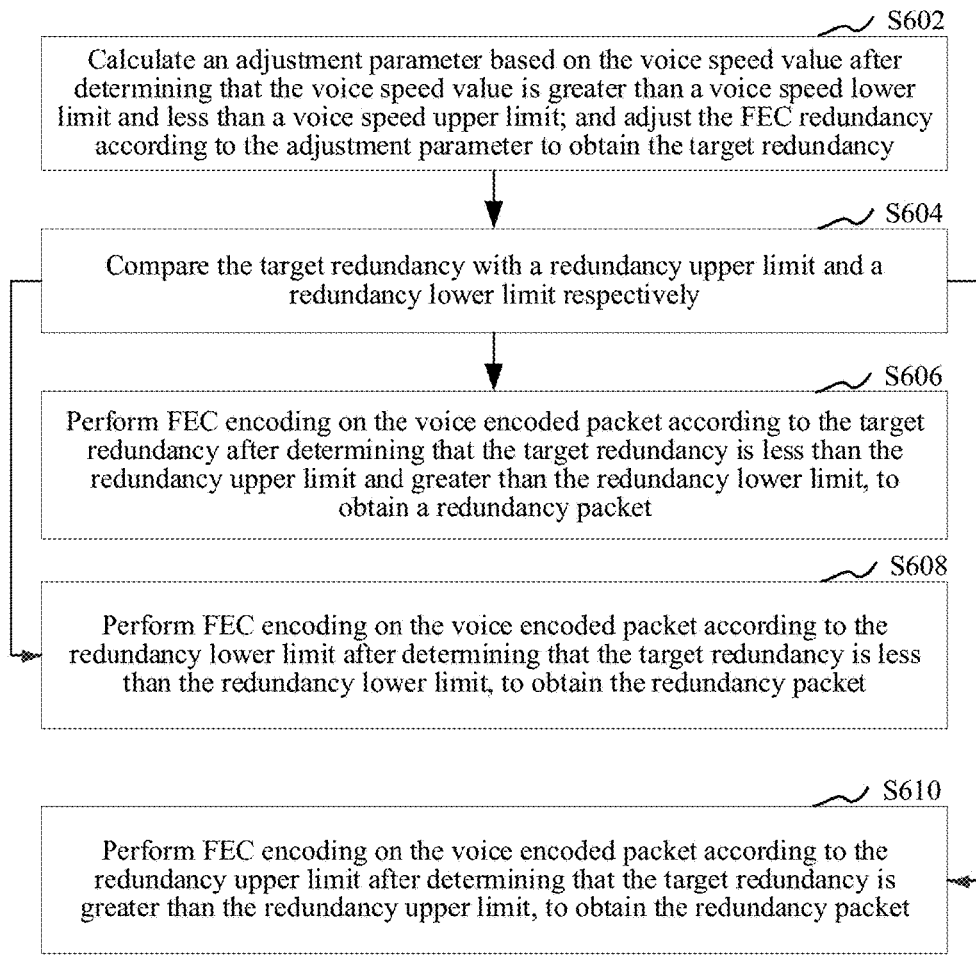
FIG. 6 is a schematic flowchart adjusting an FEC redundancy, comparing an obtained target redundancy with a redundancy upper limit and a redundancy lower limit, and performing FEC encoding according to a comparison result according to an embodiment of the present disclosure.

In an embodiment, as shown in FIG. 6, S206 may further include the followings.

S602: Calculate an adjustment parameter based on the voice speed value after determining that the voice speed value is greater than a voice speed lower limit and less than a voice speed upper limit; and adjust the FEC redundancy according to the adjustment parameter to obtain the target redundancy.

In an embodiment, when the voice speed value is greater than the voice speed lower limit and less than the voice speed upper limit, if the voice speed value is greater, the terminal increases the FEC redundancy; and if the voice speed value is smaller, the terminal decreases the FEC redundancy.

In an embodiment, the terminal inputs the voice speed value into a calculation formula used to adjust the FEC redundancy. When an adjustment parameter is calculated, the FEC redundancy is also adjusted, to obtain the target redundancy.

For example, the calculation formula for adjusting the FEC redundancy may be $$r' = r_0 + c \times \left( v - \frac{V_1 + V_2}{2} \right),$$

$V_1 \leq v \leq V_2$, where r' is the adjusted target redundancy, $r_0$ is the FEC redundancy, and $$c \times \left( v - \frac{V_1 + V_2}{2} \right)$$

is the adjustment parameter, c being a constant, v being the voice speed value, and $V_1$ and $V_2$ being the voice speed lower limit and the voice speed upper limit respectively.

S604: Compare the target redundancy with a redundancy upper limit and a redundancy lower limit respectively.

For example, referring to the following function $$r' = \max\left( R_{min}, \min\left( R_{max}, r_0 + c \times \left( v - \frac{V_1 + V_2}{2} \right) \right) \right),$$

$V_1 \leq v \leq V_2$, the target redundancy $$r_0 + c \times \left( v - \frac{V_1 + V_2}{2} \right)$$

is compared with the redundancy upper limit $R_{max}$ and the redundancy lower limit $R_{min}$ respectively, and the final target redundancy is determined according to a comparison result. When the target redundancy is less than the redundancy upper limit and greater than the redundancy lower limit, the target redundancy $$r_0 + c \times \left( v - \frac{V_1 + V_2}{2} \right)$$

is used as the final target redundancy, and S606 is performed. When the target redundancy is less than the redundancy lower limit, the redundancy lower limit is used as the final target redundancy, and S608 is performed. When the target redundancy is greater than the redundancy upper limit, the redundancy upper limit is used as the final target redundancy, and S610 is performed.

S606: Perform FEC encoding on the voice encoded packet according to the target redundancy after determining that the target redundancy is less than the redundancy upper limit and greater than the redundancy lower limit, to obtain a redundancy packet.

In an embodiment, the terminal performs FEC encoding on the voice encoded packet according to the target redundancy, to obtain the redundancy packet. A number of the redundancy packets is a product of the target redundancy and a number of the voice encoded packets.

For example, it is assumed that the number of the voice encoded packets is k, a word length is w bits, and the value of w may be 8, 16, or 32. The terminal performs FEC encoding on the k voice encoded packets according to the target redundancy, and generates m redundancy packets corresponding to the voice encoded packets.

S608: Perform FEC encoding on the voice encoded packet according to the redundancy lower limit after determining that the target redundancy is less than the redundancy lower limit, to obtain the redundancy packet.

In an embodiment, when the target redundancy is less than the redundancy lower limit, the terminal performs FEC encoding on the voice encoded packet according to the redundancy lower limit, to obtain the redundancy packet. A number of the redundancy packets is a product of the redundancy lower limit and a number of the voice encoded packets.

S610: Perform FEC encoding on the voice encoded packet according to the redundancy upper limit after determining that the target redundancy is greater than the redundancy upper limit, to obtain the redundancy packet.

In an embodiment, when the target redundancy is greater than the redundancy upper limit, the terminal performs FEC encoding on the voice encoded packet according to the redundancy upper limit, to obtain the redundancy packet. A number of the redundancy packets is a product of the redundancy upper limit and a number of the voice encoded packets.

Referring to the following function $$r' = \begin{cases} \max(R_{min}, r_0) & \text{if } (v < V_1) \\ \max\left(R_{min}, \min\left(R_{max}, r_0 + c \times \left(v - \frac{V_1 + V_2}{2}\right)\right)\right) & \text{if } (V_1 \le v \le V_2), \\ \min(R_{max}, r_0) & \text{if } (v > V_2) \end{cases}$$

a maximum value is selected from the FEC redundancy and a redundancy lower limit after determining that the voice speed value is less than a voice speed upper limit, and FEC encoding is performed on the voice encoded packet according to the maximum value, to obtain the redundancy packet; the operation of performing FEC encoding on the voice encoded packet according to the target redundancy to obtain a redundancy packet is performed after determining that the voice speed value is greater than a voice speed lower limit and less than the voice speed upper limit; and a minimum value is selected from the FEC redundancy and the redundancy upper limit after determining that the voice speed value is greater than the voice speed upper limit, to perform FEC encoding on the voice encoded packet according to the minimum value to obtain the redundancy packet.

In the foregoing embodiment, the FEC redundancy is adjusted according to the voice speed value to obtain the adjusted target redundancy, so that FEC encoding can be performed on the voice encoded packet according to the target redundancy to obtain the redundancy packet. The redundancy packet and the voice encoded packet are encapsulated into the voice packet and transmitted to the receiving end, which can ensure that a lost voice packet during the transmission can be effectively restored, thereby implementing effective error correction of the voice packet, and avoiding the additional consumption of a large amount of bandwidths.

In an embodiment, voice speed detection is first performed on the voice of the user to obtain an average voice speed value 'v'. It is assumed that an FEC redundancy obtained based on the conventional FEC solution is $r_0$, and the target redundancy after adjustment in this embodiment is r', the calculation of the average voice speed value of the voice, the method of adjusting the FEC redundancy, and the FEC encoding through the adjusted target redundancy are as follows:

1) Calculate an Average Voice Speed

During an actual call, because speaking content is not limited, a non-reference detection method is used in this embodiment to measure a voice speed of the speaker. The calculation of non-reference voice speed detection is implemented based on statistics of a change speed of vad and pitch period. Because a pitch period (or a pitch frequency) before and after the same phoneme is continuous, that is, the hopping is relatively small, and pitch periods (or pitch frequencies) before and after different phonemes have obvious hoppings. The voice speed v is equivalently described by analyzing a number of mutations of the pitch period (or a pitch frequency) per unit time and a number of voice frame hoppings. A pseudo code thereof is as follows:

//initial
Changecnt=0;// Changecnt represents a sum of a number of hoppings of the pitch frequency per unit time and a number of hoppings from a non-voice frame to a voice frame
Totcnt=0;// Totcnt represents a number of currently detected frames
vad_cur=0;// vad_cur represents a voice identifier of a current frame, where a value thereof being 0 indicates that the frame is a non-voice frame, and the value being 1 indicates that the frame is a voice frame
vad_pre=0;// vad_pre represents a voice identifier of a previous frame, where a value thereof being 0 indicates that the frame is a non-voice frame, and the value being 1 indicates that the frame is a voice frame
pitchfreq_cur=0;// pitchfreq_cur represents a pitch frequency of the current frame
pitchfreq_pre=0;// pitchfreq_pre represents a pitch frequency of the previous frame
pitchfreq_cur=PitchFreqEst(pcmdata);// PitchFreqEst( ) is the pitch frequency estimation function, the input is the PCM voice data, and the output is the estimated pitch frequency. The pitch frequency estimation may be calculated based on time-domain autocorrelation or a cepstrum method
vad_cur=VadDet(pcmdata);// VadDet( ) is the vad voice detection function, the input is the PCM voice data, and the output is the voice identifier, where the output being 0 indicates that the frame is a non-voice frame without voice content, and the output being 1 indicates that the frame is a voice frame with voice content
If Totcnt<=T Then // T represents a voice speed detection period
Totcnt++;
If vad_cur=1 Then
if abs(pitchfreq_pre-pitchfreq_cur)>threshold1 Then // threshold1 represents the preset pitch frequency hopping threshold. If the change value exceeds the threshold, the pitch changes significantly
Changecnt++;
End
End
pitchfreq_pre=pitchfreq_cur;
If vad_cur=1 and vad_pre=0 Then
Changecnt++;
End
Else
v=Changecnt;
Totcnt=0;
Changecnt=0;
End Through the foregoing process, a concatenated voice speed value v may be obtained for subsequent FEC redundancy calculation.

2) FEC Redundancy Calculation

The average voice speed value v obtained above, and the final target redundancy r' are obtained by using the following calculation formula:

$$r' = \begin{cases} \max(R_{min}, r_0) & \text{if } (v < V_1) \\ \max\left(R_{min}, \min\left(R_{max}, r_0 + c \times \left(v - \frac{V_1 + V_2}{2}\right)\right)\right) & \text{if } (V_1 \leq v \leq V_2) \\ \min(R_{max}, r_0) & \text{if } (v > V_2) \end{cases}$$

In the foregoing formula, the following constant values are preset: the voice speed upper limit $V_2$ and the voice speed lower limit $V_1$, the redundancy lower limit $R_{min}$ and the redundancy upper limit $R_{max}$, and the constant c. The target redundancy r' may be calculated by using the foregoing formula.

Figure 7:
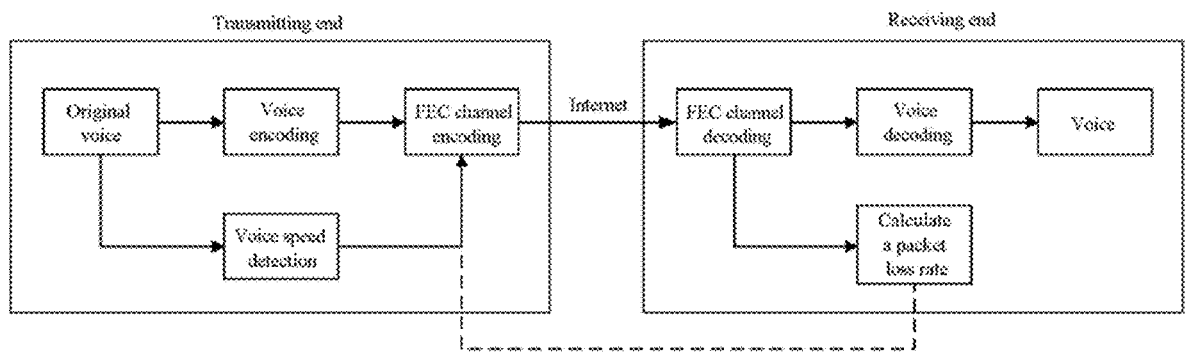
FIG. 7 is a schematic flowchart of adjusting an FEC redundancy and performing FEC encoding by a transmitting end, and performing FEC decoding to restore a voice encoded packet by a receiving end according to an embodiment of the present disclosure.

3) Obtain the voice uttered by the user, and perform voice encoding on the voice to obtain a plurality of voice encoded packets; perform FEC encoding on the voice encoded packets according to the target redundancy r' to obtain corresponding redundancy packets; use the RTP method to pack the redundancy packets and the voice encoded packets to obtain RTP voice packets; and transmit the RTP voice packets to the receiving end through the network, as shown in FIG. 7.

As shown in FIG. 7, after receiving the RTP voice packets, the receiving end counts a packet loss rate and performs FEC decoding to restore lost voice encoded packets, and decodes all the voice encoded packets, to obtain the original voice of the user.

The FEC redundancy is adjusted based on a voice speed detection result of the speaker, to ensure more effective protection of the transmitted voice content, improve the voice quality of end-to-end calls, and implement the high-reliability Voice over Internet Protocol (VoIP), and real-time voice data transmission of services such as broadcast, voice, and video live broadcast.

FIG. 2, FIG. 5, and FIG. 6 are schematic flowcharts of a voice processing method according to an embodiment of the present disclosure. It is to be understood that, although the steps in the flowcharts of FIG. 2, FIG. 5, and FIG. 6 are sequentially displayed according to indication of arrows, the steps are not necessarily sequentially performed in the sequence indicated by the arrows. Unless clearly specified in this specification, there is no strict sequence limitation on the execution of the steps, and the steps may be performed in other sequences. In addition, at least some steps in FIG. 2, FIG. 5, and FIG. 6 may include a plurality of substeps or a plurality of stages. The substeps or the stages are not necessarily performed at the same moment, and instead may be performed at different moments. The substeps or the stages are not necessarily performed sequentially, and instead may be performed in turn or alternately with another step or at least some of substeps or stages of the another step.

Figure 8:
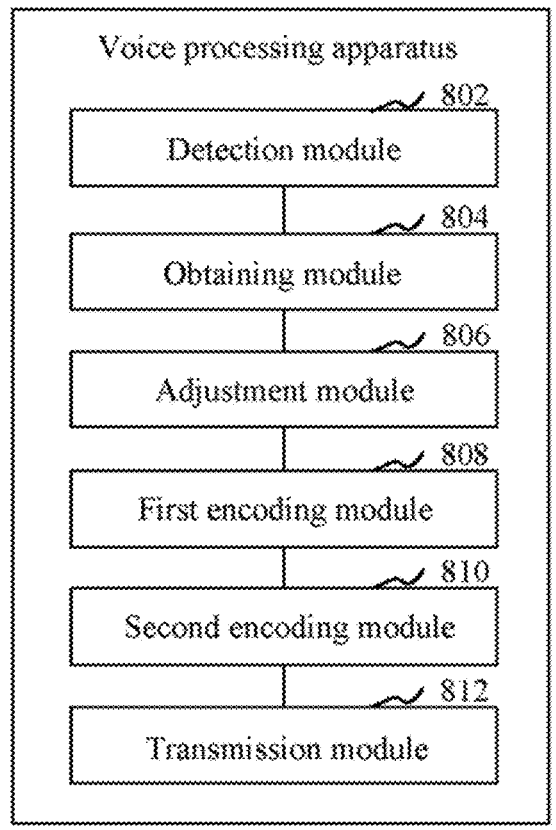
FIG. 8 is a structural block diagram of a voice processing apparatus according to an embodiment of the present disclosure.

As shown in FIG. 8, an embodiment of the present invention provides a voice processing apparatus. The apparatus includes: a detection module 802, an obtaining module 804, an adjustment module 806, a first encoding module 808, a second encoding module 810, and a transmission module 812. The detection module 802 is configured to perform voice speed detection on an obtained voice, to obtain a voice speed value; the obtaining module 804 is configured to obtain an FEC redundancy; the adjustment module 806 is configured to adjust the FEC redundancy according to the voice speed value to obtain a target redundancy; the first encoding module 808 is configured to perform voice encoding on the voice to obtain a voice encoded packet; the second encoding module 810 is configured to perform FEC encoding on the voice encoded packet according to the target redundancy to obtain a redundancy packet; and the transmission module 812 is configured to transmit the redundancy packet and the voice encoded packet to a receiving end.

Figure 9:
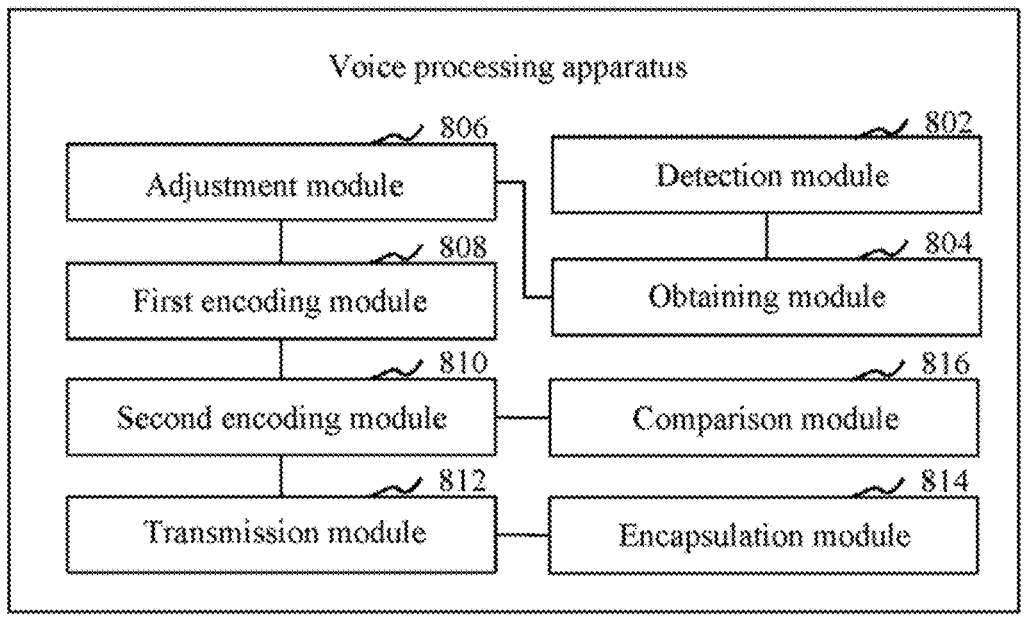
FIG. 9 is a structural block diagram of a voice processing apparatus according to another embodiment of the present disclosure.

In an embodiment, as shown in FIG. 9, the apparatus further includes an encapsulation module 814, and the encapsulation module 814 is configured to encapsulate the voice encoded packet and the redundancy packet by using an RTP to obtain an encapsulated voice packet. The transmission module 812 is further configured to transmit the voice packet obtained by encapsulating the voice encoded packet and the redundancy packet to the receiving end.

Thus, voice speed detection is performed on the voice, and the voice speed value obtained through detection is used to adjust the FEC redundancy, so that the adjusted target redundancy may be used to perform FEC encoding on the voice encoded packet, to obtain the redundancy packet. When the voice speed is relatively slow, the voice packet includes less voice content; and when the voice speed is relatively fast, the voice packet includes more voice content. The FEC redundancy is dynamically adjusted according to the voice speed value, which can ensure that a lost voice packet can be effectively restored, thereby implementing effective error correction of the voice packet, and avoiding the additional consumption of a large amount of bandwidths.

In an embodiment, the detection module 802 is further configured to: obtain a voice; recognize a phoneme sequence from the obtained voice; and determine the voice speed value according to hopping frequencies of phonemes in the phoneme sequence.

In an embodiment, the detection module 802 is further configured to: perform PCM on the voice to obtain voice encoded data; recognize a voice segment from the voice encoded data; and recognize the phoneme sequence from the voice segment of the voice encoded data.

In an embodiment, the detection module 802 is further configured to: extract a voice feature from the voice; decode the voice feature to obtain the decoded voice feature; and recognize the phoneme sequence from the decoded voice feature.

In an embodiment, the detection module 802 is further configured to: detect a number of hoppings of a pitch period or a pitch frequency of phonemes in the phoneme sequence per unit time; and determine the voice speed value according to the number of hoppings per unit time.

Thus, the phoneme sequence is recognized from the collected voice, and the voice speed value is determined according to the hopping frequencies of the phonemes in the phoneme sequence, so that the FEC redundancy can be dynamically adjusted according to the voice speed value, which can ensure that a lost voice packet can be effectively restored, thereby implementing effective error correction of the voice packet, and avoiding the additional consumption of a large amount of bandwidths.

In an embodiment, the adjustment module 806 is further configured to: calculate an adjustment parameter based on the voice speed value after determining that the voice speed value is greater than a voice speed lower limit and less than a voice speed upper limit; and adjust the FEC redundancy according to the adjustment parameter to obtain the target redundancy.

In an embodiment, as shown in FIG. 9, the apparatus further includes a comparison module 816. The comparison module 816 is configured to compare the target redundancy with a redundancy upper limit and a redundancy lower limit respectively; and after determining that the target redundancy is less than the redundancy upper limit and greater than the redundancy lower limit, the second encoding module 810 performs FEC encoding on the voice encoded packet according to the target redundancy, to obtain a redundancy packet.

In an embodiment, the second encoding module 810 is further configured to perform FEC encoding on the voice encoded packet according to the redundancy lower limit after determining that the target redundancy is less than the redundancy lower limit, to obtain the redundancy packet; and perform FEC encoding on the voice encoded packet according to the redundancy upper limit after determining that the target redundancy is greater than the redundancy upper limit, to obtain the redundancy packet.

In an embodiment, the second encoding module 810 is further configured to: select a maximum value from the FEC redundancy and a redundancy lower limit after determining that the voice speed value is less than a voice speed upper limit, and perform FEC encoding on the voice encoded packet according to the maximum value, to obtain the redundancy packet; perform, after determining that the voice speed value is greater than a voice speed lower limit and less than the voice speed upper limit, the operation of performing FEC encoding on the voice encoded packet according to the target redundancy to obtain a redundancy packet; and select a minimum value from the FEC redundancy and the redundancy upper limit after determining that the voice speed value is greater than the voice speed upper limit, to perform FEC encoding on the voice encoded packet according to the minimum value to obtain the redundancy packet.

Thus, the FEC redundancy is adjusted according to the voice speed value to obtain the adjusted target redundancy, so that FEC encoding can be performed on the voice encoded packet according to the target redundancy to obtain the redundancy packet. The redundancy packet and the voice encoded packet are encapsulated into the voice packet and transmitted to the receiving end, which can ensure that a lost voice packet during the transmission can be effectively restored, thereby implementing effective error correction of the voice packet, and avoiding the additional consumption of a large amount of bandwidths.

Figure 10:
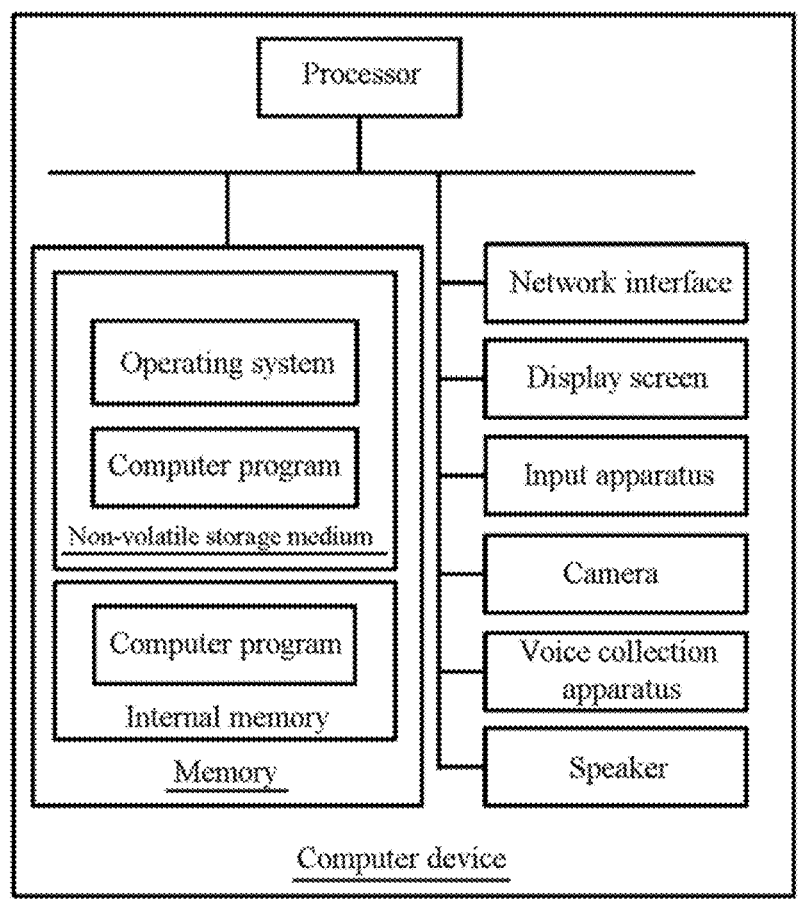
FIG. 10 is a structural block diagram of a computer device according to an embodiment of the present disclosure.

FIG. 10 is a diagram of an internal structure of a computer device according to an embodiment of the present disclosure. The computer device may be specifically the terminal 110 in FIG. 1. As shown in FIG. 10, the computer device includes a processor, a memory, a network interface, an input apparatus and a display screen that are connected by using a system bus. The memory includes a non-volatile storage medium and an internal memory. The non-volatile storage medium of the computer device stores an operating system and may further store a computer program, the computer program, when executed by the processor, causing the processor to implement the voice processing method. The internal memory may also store a computer program, the computer program, when executed by the processor, may cause the processor to perform the various voice processing methods. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art can understand that, the structure shown in FIG. 10 is only a block diagram of a part of a structure related to a solution of the present disclosure and does not limit the computer device to which the solution of the present disclosure is applied. Specifically, the computer device may include more or fewer members than those in the drawings, or include a combination of some members, or include different member layouts.

In an embodiment, the voice processing apparatus provided in the present disclosure may be implemented in a form of a computer program, and the computer program may be run on the computer device shown in FIG. 10. The memory of the computer device may store program modules forming the voice processing apparatus, for example, the detection module 802, the obtaining module 804, the adjustment module 806, the first encoding module 808, the second encoding module 810, and the transmission module 812 shown in FIG. 8. A computer program formed by the program modules causes the processor to perform steps in the voice processing method in the embodiments of the present disclosure described in this specification.

For example, the computer device shown in FIG. 10 may perform S202 by using the detection module 802 in the voice processing apparatus shown in FIG. 8. The computer device may perform S204 by using the obtaining module 804. The computer device may perform S206 by using the adjustment module 806. The first encoding module 808 performs S208. The computer device may perform S210 by using the second encoding module 810. The computer device may perform S212 by using the transmission module 812.

In an embodiment, a computer device is provided, including a memory and a processor, the memory storing a computer program, and the computer program, when executed by the processor, causing the processor to perform the following steps: performing voice speed detection on an obtained voice, to obtain a voice speed value; obtaining an FEC redundancy; adjusting the FEC redundancy according to the voice speed value to obtain a target redundancy; performing voice encoding on the voice to obtain a voice encoded packet; performing FEC encoding on the voice encoded packet according to the target redundancy to obtain a redundancy packet; and transmitting the redundancy packet and the voice encoded packet to a receiving end.

In an embodiment, when the processor performs the process of performing voice speed detection on an obtained voice, to obtain a voice speed value, the computer program causes the processor to specifically perform the followings: obtaining a voice; recognizing a phoneme sequence from the voice; and determining the voice speed value according to hopping frequencies of phonemes in the phoneme sequence.

In an embodiment, when the processor performs the process of recognizing a phoneme sequence from the voice, the computer program causes the processor to specifically perform the followings: performing PCM on the voice to obtain voice encoded data; recognizing a voice segment including voice content from the voice encoded data; and recognizing the phoneme sequence from the voice segment of the voice encoded data.

In an embodiment, when the processor performs the process of recognizing a phoneme sequence from the voice, the computer program causes the processor to specifically perform the followings: extracting a voice feature from the voice; decoding the voice feature to obtain the decoded voice feature; and recognizing the phoneme sequence from the decoded voice feature.

In an embodiment, when the processor performs the process of determining the voice speed value according to hopping frequencies of phonemes in the phoneme sequence, the computer program causes the processor to specifically perform the followings: detecting a number of hoppings of a pitch period or a pitch frequency of phonemes in the phoneme sequence per unit time; and determining the voice speed value according to the number of hoppings per unit time.

In an embodiment, when the processor performs the process of adjusting the FEC redundancy according to the voice speed value to obtain a target redundancy, the computer program causes the processor to specifically perform the followings: calculating an adjustment parameter based on the voice speed value after determining that the voice speed value is greater than a voice speed lower limit and less than a voice speed upper limit; and adjusting the FEC redundancy according to the adjustment parameter to obtain the target redundancy.

In an embodiment, when executed by the processor, the computer program causes the processor to further perform the followings: comparing the target redundancy with a redundancy upper limit and a redundancy lower limit respectively; and performing, after determining that the target redundancy is less than the redundancy upper limit and greater than the redundancy lower limit, the operation of performing FEC encoding on the voice encoded packet according to the target redundancy to obtain a redundancy packet.

In an embodiment, when executed by the processor, the computer program causes the processor to further perform the followings: performing FEC encoding on the voice encoded packet according to the redundancy lower limit after determining that the target redundancy is less than the redundancy lower limit, to obtain the redundancy packet; and performing FEC encoding on the voice encoded packet according to the redundancy upper limit after determining that the target redundancy is greater than the redundancy upper limit, to obtain the redundancy packet.

In an embodiment, when executed by the processor, the computer program causes the processor to further perform the followings: selecting a maximum value from the FEC redundancy and a redundancy lower limit after determining that the voice speed value is less than a voice speed upper limit, and performing FEC encoding on the voice encoded packet according to the maximum value, to obtain the redundancy packet; performing, after determining that the voice speed value is greater than a voice speed lower limit and less than the voice speed upper limit, the operation of performing FEC encoding on the voice encoded packet according to the target redundancy to obtain a redundancy packet; and selecting a minimum value from the FEC redundancy and the redundancy upper limit after determining that the voice speed value is greater than the voice speed upper limit, to perform FEC encoding on the voice encoded packet according to the minimum value to obtain the redundancy packet.

In an embodiment, when executed by the processor, the computer program causes the processor to further perform the followings: encapsulating the voice encoded packet and the redundancy packet by using an RTP to obtain an encapsulated voice packet.

In an embodiment, when the processor performs the process of transmitting the redundancy packet and the voice encoded packet to a receiving end, the computer program causes the processor to specifically perform the followings: transmitting the voice packet obtained by encapsulating the voice encoded packet and the redundancy packet to the receiving end.

In an embodiment, a computer-readable storage medium is provided, storing a computer program, the computer program, when executed by a processor, causing the processor to perform the followings: performing voice speed detection on an obtained voice, to obtain a voice speed value; obtaining an FEC redundancy; adjusting the FEC redundancy according to the voice speed value to obtain a target redundancy; performing voice encoding on the voice to obtain a voice encoded packet; performing FEC encoding on the voice encoded packet according to the target redundancy to obtain a redundancy packet; and transmitting the redundancy packet and the voice encoded packet to a receiving end.

In an embodiment, when the processor performs the process of performing voice speed detection on an obtained voice, to obtain a voice speed value, the computer program causes the processor to specifically perform the followings: obtaining a voice; recognizing a phoneme sequence from the voice; and determining the voice speed value according to hopping frequencies of phonemes in the phoneme sequence.

In an embodiment, when the processor performs the process of recognizing a phoneme sequence from the voice, the computer program causes the processor to specifically perform the followings: performing PCM on the voice to obtain voice encoded data; recognizing a voice segment including voice content from the voice encoded data; and recognizing the phoneme sequence from the voice segment of the voice encoded data.

In an embodiment, when the processor performs the process of recognizing a phoneme sequence from the voice, the computer program causes the processor to specifically perform the followings: extracting a voice feature from the voice; decoding the voice feature to obtain the decoded voice feature; and recognizing the phoneme sequence from the decoded voice feature.

In an embodiment, when the processor performs the process of determining the voice speed value according to hopping frequencies of phonemes in the phoneme sequence, the computer program causes the processor to specifically perform the followings: detecting a number of hoppings of a pitch period or a pitch frequency of phonemes in the phoneme sequence per unit time; and determining the voice speed value according to the number of hoppings per unit time.

In an embodiment, when the processor performs the process of adjusting the FEC redundancy according to the voice speed value to obtain a target redundancy, the computer program causes the processor to specifically perform the followings: calculating an adjustment parameter based on the voice speed value after determining that the voice speed value is greater than a voice speed lower limit and less than a voice speed upper limit; and adjusting the FEC redundancy according to the adjustment parameter to obtain the target redundancy.

In an embodiment, when executed by the processor, the computer program causes the processor to further perform the followings: comparing the target redundancy with a redundancy upper limit and a redundancy lower limit respectively; and performing, after determining that the target redundancy is less than the redundancy upper limit and greater than the redundancy lower limit, the operation of performing FEC encoding on the voice encoded packet according to the target redundancy to obtain a redundancy packet.

In an embodiment, when executed by the processor, the computer program causes the processor to further perform the followings: performing FEC encoding on the voice encoded packet according to the redundancy lower limit after determining that the target redundancy is less than the redundancy lower limit, to obtain the redundancy packet;

and performing FEC encoding on the voice encoded packet according to the redundancy upper limit after determining that the target redundancy is greater than the redundancy upper limit, to obtain the redundancy packet.

In an embodiment, when executed by the processor, the computer program causes the processor to further perform the followings: selecting a maximum value from the FEC redundancy and a redundancy lower limit after determining that the voice speed value is less than a voice speed upper limit, and performing FEC encoding on the voice encoded packet according to the maximum value, to obtain the redundancy packet; performing, after determining that the voice speed value is greater than a voice speed lower limit and less than the voice speed upper limit, the operation of performing FEC encoding on the voice encoded packet according to the target redundancy to obtain a redundancy packet; and selecting a minimum value from the FEC redundancy and the redundancy upper limit after determining that the voice speed value is greater than the voice speed upper limit, to perform FEC encoding on the voice encoded packet according to the minimum value to obtain the redundancy packet.

In an embodiment, when executed by the processor, the computer program causes the processor to further perform the followings: encapsulating the voice encoded packet and the redundancy packet by using an RTP to obtain an encapsulated voice packet.

In an embodiment, when the processor performs the step of transmitting the redundancy packet and the voice encoded packet to a receiving end, the computer program causes the processor to specifically perform the following: transmitting the voice packet obtained by encapsulating the voice encoded packet and the redundancy packet to the receiving end.

A person of ordinary skill in the art can understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a storage, a database, or another medium used in the embodiments provided in the present disclosure can include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The foregoing embodiments only show several implementations of the present disclosure, and descriptions thereof are in detail, but are not to be understood as a limitation to the patent scope of the present disclosure. A person of ordinary skill in the art may further make several variations and improvements without departing from the ideas of the present disclosure, and such variations and improvements all fall within the protection scope of the present disclosure. Therefore, the protection scope of the present disclosure is subject to the protection scope of the appended claims.

What is claimed is:

1. A voice processing method for a terminal, comprising:
performing voice speed detection on a voice obtained from a voice source, to obtain a voice speed value of the voice, wherein the voice speed value indicates a speaking speed of a speaker that utters the voice;
obtaining a forward error correction (FEC) redundancy;
adjusting the FEC redundancy according to the voice speed value to obtain a target redundancy, comprising:
in response to determining that the voice speed value is greater than a voice speed lower limit and less than a voice speed upper limit, calculating an adjustment parameter based on the voice speed value, and adjusting the FEC redundancy according to the adjustment parameter to obtain the target redundancy, wherein the adjusted FEC redundancy corresponding to a smaller voice speed value is less than the adjusted FEC redundancy corresponding to a greater voice speed value;
performing voice encoding on the voice to obtain a voice encoded packet;
performing FEC encoding on the voice encoded packet according to the target redundancy to obtain a redundancy packet; and
transmitting the redundancy packet and the voice encoded packet to a receiving end.

2. The method according to claim 1, wherein the performing voice speed detection on the voice obtained from a voice source, to obtain a voice speed value further comprises:
recognizing a phoneme sequence from the voice; and
determining the voice speed value according to hopping frequencies of phonemes in the phoneme sequence.

3. The method according to claim 2, wherein the recognizing a phoneme sequence from the voice comprises:
performing pulse code modulation (PCM) on the obtained voice to obtain voice encoded data;
recognizing a voice segment comprising voice content from the voice encoded data; and
recognizing the phoneme sequence from the voice segment of the voice encoded data.

4. The method according to claim 2, wherein the recognizing a phoneme sequence from the obtained voice comprises:
extracting a voice feature from the obtained voice;
decoding the voice feature to obtain the decoded voice feature; and recognizing the phoneme sequence from the decoded voice feature.

5. The method according to claim 2, wherein the determining the voice speed value according to hopping frequencies of phonemes in the phoneme sequence comprises:
detecting a number of hoppings of a pitch period or a pitch frequency of phonemes in the phoneme sequence per unit time; and
determining the voice speed value according to the number of hoppings per unit time.

6. The method according to claim 1, further comprising:
comparing the target redundancy with a redundancy upper limit and a redundancy lower limit respectively; and
performing, after determining that the target redundancy is less than the redundancy upper limit and greater than the redundancy lower limit, the operation of performing FEC encoding on the voice encoded packet according to the target redundancy to obtain a redundancy packet.

7. The method according to claim 6, further comprising:
performing FEC encoding on the voice encoded packet according to the redundancy lower limit after determining that the target redundancy is less than the redundancy lower limit, to obtain the redundancy packet; and
performing FEC encoding on the voice encoded packet according to the redundancy upper limit after determining that the target redundancy is greater than the redundancy upper limit, to obtain the redundancy packet.

8. The method according to claim 1, further comprising:
selecting a maximum value from the FEC redundancy and a redundancy lower limit after determining that the voice speed value is greater than the voice speed upper limit, and performing FEC encoding on the voice encoded packet according to the maximum value, to obtain the redundancy packet;
performing, after determining that the voice speed value is greater than the voice speed lower limit and less than the voice speed upper limit, the operation of performing FEC encoding on the voice encoded packet according to the target redundancy to obtain a redundancy packet; and
selecting a minimum value from the FEC redundancy and the redundancy upper limit after determining that the voice speed value is less than the voice speed lower limit, to perform FEC encoding on the voice encoded packet according to the minimum value to obtain the redundancy packet.

9. The method according to claim 1, wherein, before the transmitting the redundancy packet and the voice encoded packet to a receiving end:
the method further comprises:
encapsulating the voice encoded packet and the redundancy packet by using a real-time transport protocol (RTP) to obtain an encapsulated voice packet; and
the transmitting the redundancy packet and the voice encoded packet to a receiving end further comprises:
transmitting the voice packet obtained by encapsulating the voice encoded packet and the redundancy packet to the receiving end.

10. A voice processing apparatus, comprising:
at least one a memory storing computer program instructions; and
at least one processor coupled to the at least one memory and, when executing the computer program instructions, configured to perform:
performing voice speed detection on a voice obtained from a voice source, to obtain a voice speed value of the voice, wherein the voice speed value indicates a speaking speed of a speaker that utters the voice;
obtaining a forward error correction (FEC) redundancy;
adjusting the FEC redundancy according to the voice speed value to obtain a target redundancy, comprising:
in response to determining that the voice speed value is greater than a voice speed lower limit and less than a voice speed upper limit, calculating an adjustment parameter based on the voice speed value, and adjusting the FEC redundancy according to the adjustment parameter to obtain the target redundancy, wherein the adjusted FEC redundancy corresponding to a smaller voice speed value is less than the adjusted FEC redundancy corresponding to a greater voice speed value;
performing voice encoding on the voice to obtain a voice encoded packet;
performing FEC encoding on the voice encoded packet according to the target redundancy to obtain a redundancy packet; and
transmitting the redundancy packet and the voice encoded packet to a receiving end.

11. The apparatus according to claim 10, wherein the performing voice speed detection on the voice obtained from a voice source, to obtain a voice speed value further comprises:
recognizing a phoneme sequence from the voice; and
determining the voice speed value according to hopping frequencies of phonemes in the phoneme sequence.

12. The apparatus according to claim 11, wherein the recognizing a phoneme sequence from the voice comprises:
performing pulse code modulation (PCM) on the obtained voice to obtain voice encoded data;
recognizing a voice segment comprising voice content from the voice encoded data; and
recognizing the phoneme sequence from the voice segment of the voice encoded data.

13. The apparatus according to claim 11, wherein the recognizing a phoneme sequence from the obtained voice comprises:
extracting a voice feature from the obtained voice;
decoding the voice feature to obtain the decoded voice feature; and
recognizing the phoneme sequence from the decoded voice feature.

14. The apparatus according to claim 11, wherein the determining the voice speed value according to hopping frequencies of phonemes in the phoneme sequence comprises:
detecting a number of hoppings of a pitch period or a pitch frequency of phonemes in the phoneme sequence per unit time; and
determining the voice speed value according to the number of hoppings per unit time.

15. The apparatus according to claim 10, wherein the at least one processor is further configured to perform:
comparing the target redundancy with a redundancy upper limit and a redundancy lower limit respectively; and
performing, after determining that the target redundancy is less than the redundancy upper limit and greater than the redundancy lower limit, the operation of performing FEC encoding on the voice encoded packet according to the target redundancy to obtain a redundancy packet.

16. The apparatus according to claim 15, wherein the at least one processor is further configured to perform:
- performing FEC encoding on the voice encoded packet according to the redundancy lower limit after determining that the target redundancy is less than the redundancy lower limit, to obtain the redundancy packet; and
- performing FEC encoding on the voice encoded packet according to the redundancy upper limit after determining that the target redundancy is greater than the redundancy upper limit, to obtain the redundancy packet.

17. A non-transitory computer-readable storage medium storing computer program instructions executable by at least one processor to perform:
- performing voice speed detection on a voice obtained from a voice source, to obtain a voice speed value of the voice, wherein the voice speed value indicates a speaking speed of a speaker that utters the voice;
- obtaining a forward error correction (FEC) redundancy;
- adjusting the FEC redundancy according to the voice speed value to obtain a target redundancy, comprising:
  - in response to determining that the voice speed value is greater than a voice speed lower limit and less than a voice speed upper limit, calculating an adjustment parameter based on the voice speed value, and adjusting the FEC redundancy according to the adjustment parameter to obtain the target redundancy, wherein the adjusted FEC redundancy corresponding to a smaller voice speed value is less than the adjusted FEC redundancy corresponding to a greater voice speed value;
- performing voice encoding on the voice to obtain a voice encoded packet;
- performing FEC encoding on the voice encoded packet according to the target redundancy to obtain a redundancy packet; and
- transmitting the redundancy packet and the voice encoded packet to a receiving end.

18. The non-transitory computer-readable storage medium according to claim 17, wherein the performing voice speed detection on the voice obtained from a voice source, to obtain a voice speed value further comprises:
- recognizing a phoneme sequence from the voice; and
- determining the voice speed value according to hopping frequencies of phonemes in the phoneme sequence.

* * * * *